3,163,851
CIRCUIT ARRANGEMENT COMPRISING A CONTROLLING CROSS-BAR SYSTEM
Edward Fokko de Haan, Johannes Gerrit van Santen, Simon Duinker, Gersinus Diemer, and Leonard Johan Tummers, all of Eindhoven, Netherlands, assignors to North American Philips Company, Inc., New York, N.Y., a corporation of Delaware
Filed Sept. 29, 1960, Ser. No. 59,255
Claims priority, application Netherlands Oct. 2, 1959
11 Claims. (Cl. 340—173)

This invention relates to a controlling cross-bar system consisting of; (1) at least two groups $x$ and $y$ of crossing conductors; (2) a write circuit comprising a memory storage element being added to each crossing, in which element the information supplied in the form of electrical signals to the cross-bar system is periodically stored for the crossing concerned, so that the impedance of the storage element varies; and (3) a reading circuit associated with each crossing and comprising a reproducing element connected to the respective storage element, but included in a separate, continuously operated circuit.

Such a circuit arrangement is known from the article of E. A. Sack: "A New Electro-Luminescent Display," in Proc. I.R.E. of October 1958, vol. 46, No. 10, pages 1694 to 1699. In this article it is stated how the memory action of ferroelectric materials can be employed successfully in order to increase the luminous output of the reproduced images and to reduce flicker at the same time.

In known circuits, it is necessary, if the memory action of the storage elements is to be utilized fully, that the reading circuit should be continuously operated so that the storage elements are all connected in parallel with a separate, continuously operated activating source, for example, via a third group of conductors $a$, which are connected to each other. However, the image information, fed to the cross-bar system, is to be supplied for short instants via the crossings concerned to the storage elements so that no cross-talk of the information intended for one storage element to the other element can occur. Moreover, the write circuit must not be influenced by the reading circuit, so that separate circuits are required.

The above article does not discuss all of these problems. In the corresponding United States Patents 2,917,667 and 2,888,593, these problems are eliminated by providing a switch which supplies the image information alternately to each storage element. A mechanical switch of this kind cannot be designed and an electric switch, for example, the cathode-ray tube described in the above patents, has the disadvantage that the assembly is housed in a large, exhausted tube. It would be desirable, of course, to provide a flat display screen that could be manufactured without involving too much additional cost.

The circuit arrangement according to the invention provides a solution of all these problems and is characterized in that at each crossing a unilaterally conductive element is connected (for example via an adder circuit) between a conductor of the $x$-group and the storage element associated with the crossing concerned. In order to block the unilaterally conductive elements a D.C.-voltage source is included in the arrangement. This source is connected through resistance elements to all of the unilaterally conductive elements. Means are provided for sequentially switching the conductors of the $y$-group so that the blocking voltage for the unilaterally conductive elements associated with the switched conductor is removed for the writing period of the storage elements.

A display panel suitable for use in such a circuit arrangement may be constructed on a transparent support of, for example, glass. Parallel conductors of the $y$-group, preferably made of tin oxide ($SnO_2$), are directly applied to the support. The storage elements, reproducing elements and the resistance elements are provided on each conductor in the form of three strips, extending parallel to the conductors and manufactured, respectively, from barium-strontiumtitanate $(BaTiO_3)_x$, $(SrTiO_3)_{1-x}$, zinc sulphide (ZnS), activated by $10^{-3}$ copper atoms (Cu) and $9.10^{-4}$ aluminium atoms (Al) per molecule of zinc sulphide, and carbon (C) mixed with enamel respectively. Aligned electrodes are provided transversely of the strips. These electrodes are in electric contact with the subjacent strips. Between the electrodes insulating ribs are provided extending in a direction at right angles to the conductors of the $y$-group substantially across the support. Unilaterally conductive elements are provided on one of the sides of the ribs (for example, by spraying) only at the place of the electrodes. The conductors of the $x$-group are secured to the ribs, and the assembly is filled up with a filler having a low dielectric constant such as polystyrene. The conductors of the $a$-group are arranged on the filler, just above and parallel to the aligned electrodes.

A few potential embodiments of panels according to the invention and the associated circuit elements will now be described by way of example with reference to the accompanying drawings in which.

Figure 1:
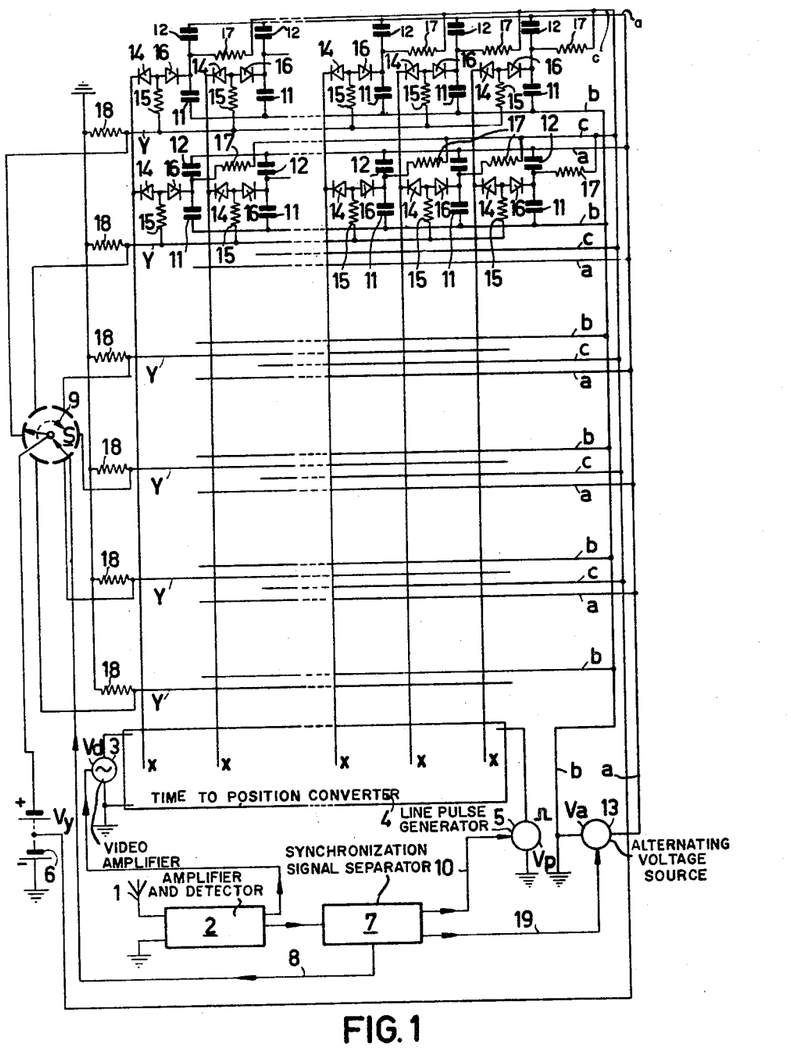
FIG. 1 is a circuit diagram of a first embodiment of a cross-bar system according to the invention, in which the reproducing elements and the storage elements are united in a first panel, and the controlling cross-bar system is housed in a second panel.

Referring to FIG. 1, the groups of conductors $x$ and $y$ represent the conductors of an orthogonal cross-bar system for converting a television signal coming in as a function of time into a signal as a function of place, and for producing at each crossing of the groups of conductors $x$ and $y$ the voltage corresponding to that crossing.

A high-frequency television signal is received by the aerial 1, amplified and detected in the device 2, and applied to the video amplifier 3. The video signals from amplifier 3 are applied to a device 4, which converts the video signal $V_d$, varying as a function of time, into a signal as a function of place, so that voltages corresponding to successive image elements of a line of an image to be reproduced may be applied to successive $x$-conductors.

After each line period the pulse generator 5 produces a pulse $V_p$, which effects the application of the converted voltages stored in the device 4, to the corresponding conductors $x$ for a predetermined time. In the meantime new video information $V_d$ is delayed to the device 4, so that a subsequent pulse $V_p$ may later effect the application of new information to the $x$-conductors for the next line of the image.

In order to ensure that the desired $y$-conductor is switched on, (i.e. the $y$-conductor associated with the information occurring at the instant concerned at the $x$-conductors), the switch S simultaneously connects the $y$-conductor concerned to the voltage source 6 at the instant when the pulse $V_p$ effects the application of the voltage to the $x$-conductors. This $y$-conductor remains switched on as long as the storage elements of the device 4 maintain the voltage across the x-conductors.

In FIG. 1 the uppermost y-conductor is switched on by the switch S so that, due to the occurrence of a pulse $V_p$, voltages occur at the crossings of this uppermost y-conductor with the x-conductors. These voltages correspond to the image information associated with these crossings. As will be described more fully hereinafter, these voltages will be transferred, in accordance with the principle of the invention, to the storage elements associated with the said uppermost y-conductor. The storage elements, in turn, control the activation of the associated reproducing elements.

The switch S is controlled by the device 7 at line frequency. To this end the detected video signal with the field- and line-synchronizing pulses is fed to the device 7 which separates these line- and field-synchronizing pulses and supplies them via the conductor 8 to the switch S. The switch S may, for example, be a stepping switch comprising one or more relays which are stepped by each line-synchronising pulse to a further contact in the direction indicated by the broken arrow. When the contact of the switch S associated with the lowermost y-conductor is switched on, the switch is not rotated any further until it is released by a field-synchronizing pulse.

The line-synchronising pulses are also fed via the conductor 10 to the generator 5, which may be an amplifier or a self-oscillating, synchronised generator circuit. The arrangement is such that, after the lowermost y-conductor has been switched on, the next-following line-synchronising pulse is transferred to the conductor 10 upon the occurrence of a field synchronising pulse. This may, for example, be realized by applying the separated line-synchronising pulses to gate circuits, of which the outputs are connected to the conductors 8 and 10 respectively. The separated field-synchronizing pulses are also applied to the gate circuits, and have a polarity which blocks the gate circuits, so that these gate circuits are open for the major part of the time, and are blocked only upon the occurrence of field-synchronizing pulses.

As a matter of course, instead of using the device 4 with the associated pulse generator 5, use may be made of any other device capable of converting the desired video information as a function of time into a signal as a function of place, which is simultaneously transferred to the x-conductor. Such a device is described, for example, in the article of E. A. Sack: ELF—"A New Electro-Luminescent Display," Proc. I.R.E., vol. 46, No. 10, October 1958, pages 1694–1699, particularly the device illustrated in FIG. 12 on page 1698.

The reproducing panel proper consists of storage elements 11, which are connected in series with the reproducing elements 12. These series circuits are connected in parallel between the conductors $a$ and $b$, which connect the series circuits to the continuously active source 13.

In order to transfer the voltages occurring in the aforesaid manner at the crossings to the storage elements 11, each crossing of an $x$ and an $y$-conductor is provided, in accordance with the principle of the invention, with adder elements 14 and 15 in series between the $x$ and $y$-conductors at the crossings. The junctions of elements 14 and 15 are connected via cutting-off diodes 16 to the junctions of the elements 11 and 12. The last-mentioned junctions are furthermore connected via switching resistors 17 and conductors $c$ to a tap on the source 6.

It should be noted that in FIG. 1 only six y-conductors and five x-conductors are shown, whilst only the circuit elements 11 to 17 associated wtih the two topmost y-conductors are shown. As a matter of course, such circuit elements are associated with each y-conductor, and the number of x-conductors and y-conductors may be extended at will.

This figure shows furthermore that each y-conductor is connected to ground by way of a decoupling resistor 18.

Figure 2:
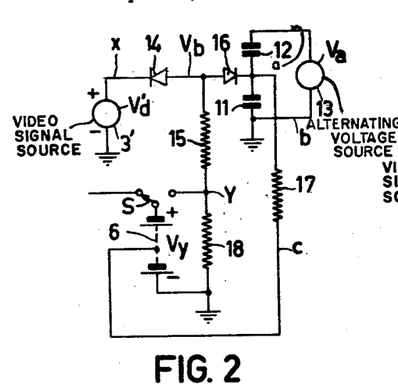
FIG. 2 shows an equivalent circuit diagram of the device shown in FIG. 1 for writing and reading one storage element and one reproducing element.

For the explanation of the operation of the system of FIG. 1, FIG. 2 shows an equivalent diagram for the control of a reproducing element associated with one crossing. In FIG. 2 the source 3' supplies a voltage $V_d'$, which is the voltage prevailing at a crossing of a given x-conductor with a given y-conductor, shortly before and during the time in which the switch S connects this y-conductor to the source 6.

Only two contacts of the switch S are shown in FIG. 2; With one contact illustrated being connected to the y-conductor.

For the time in which the switch S establishes the contact between the source 6 and the y-conductor concerned the voltage $V_d'$ can be considered as a positive direct voltage, having a value dependent upon the image information to be fed to the associated storage element 11. In this case the voltage $V_b$ at the junction of the elements 14 and 15 is determined by:

$$V_b = V_y \cdot \frac{R_{14}}{R_{14}+R_{15}} + V_d' \cdot \frac{R_{15}}{R_{14}+R_{15}} \text{ volts}$$

wherein $V_y$, expressed in volts, designates the value of the positive direct voltage supplied by the source 6, and $R_{14}$ and $R_{15}$ designate the resistance values in ohms of the adder elements 14 and 15. The voltage at the tap of source 6 is equal to $$V_c = \frac{R_{14}}{R_{14}+R_{15}} \cdot V_y \text{ volts}$$

and the voltage at the cathode of the diode 16 will be equal to $V_c$ since this cathode is connected via the resistor 17 and the conductor $c$ to the tap of source 6. When the switch S does not connect the y-conductor to the source 6, the voltage at the anode of device 16 will be equal to $$V_a = \frac{R_{15}}{R_{14}+R_{15}} \cdot V_d' \text{ volts}$$

Thus the diode 16 will be blocked in this position of switch S if $V_a < V_c$. The diode 16 will be conductive as soon as the switch S connects the y-conductor to the source 6, so that the information $V_a$ can be fed via the diode 16 to the storage element 11. The storage element 11 may be a capacitor, between the plates of which is arranged a ferro-electric material such as, for example, a mixture of barium and strontium titanate $$(BaTiO_3)_x \cdot (SrTiO_3)_{1-x}$$

Figure 6:
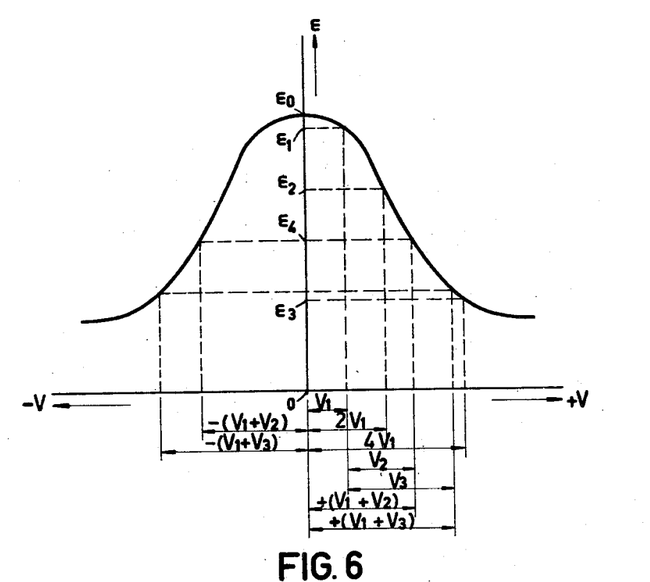
FIG. 6 shows a curve to explain the operation of storage elements that may be used in these display panels.

At room temperature $x=80\%$, which means that at this temperature 80% of the mixture is formed by barium titanate and 20% of strontiumtitanate. This material has the property that its dielectric constant $\epsilon$ decreases with an increasing absolute value of the voltage occurring across the capacitor. This variation of $\epsilon$ as a function of the applied direct voltage is illustrated in FIG. 6. From this figure it follows that the variation of $\epsilon$ for low applied voltages is only slight, but with higher applied voltages it exhibits a steeper characteristic. Use may now be made of the applied bias voltage of:

$$\frac{R_{14}}{R_{14}+R_{15}} \cdot V_y \text{ volts}$$

in order to adjust the value of $\epsilon$ so that the edge of the steep region is attained. The supplied information voltage of:

$$\frac{R_{15}}{R_{14}+R_{15}} \cdot V_d' \text{ volts}$$

is then added to the bias voltage and produces a much greater variation of $\epsilon$ than could have been attained without this bias voltage. Owing to this greater variation of $\epsilon$ the capacity value of the capacitor 11 will also vary more and thus the activating voltages on capacitors 11 and 12 (supplied by source 13) and will vary more than they would without this bias voltage. Consequently, the potential variation in light output of a reproducing element 12 will be greater, so that greater contrast differences between bright and dark parts of the images to be reproduced are obtained. The dielectric material between the plates of capacitor 12 may be zinc sulphide (ZnS) activated by $10^{-3}$ copper (Cu) and $10^{-3}$ aluminum (Al) atoms per molecule of zinc sulphide.

This may be explained with reference to FIG. 6. It is assumed, for example, that the voltage $V_1$ of this figure corresponds to:

$$\frac{R_{14}}{R_{14}+R_{15}} \cdot V_y$$

In this case this bias voltage is associated with a value of $\epsilon_1$, which is almost equal to the initial value $\epsilon_0$. Since, as will be described more fully hereinafter, it is true that:

$$\frac{R_{15}+R_{18}}{R_{14}+R_{15}+R_{18}} \cdot V_d' < \frac{R_{14}}{R_{14}+R_{15}} \cdot V_y$$

where $R_{18}$ is the resistance of resistor 18, it follows that:

$$\frac{R_{14}}{R_{14}+R_{15}} \cdot V_y + \frac{R_{15}}{R_{14}+R_{15}} \cdot V_d'$$

must remain below the value $$\frac{R_{14}}{R_{14}+R_{15}} \cdot V_y + \frac{R_{15}}{R_{14}+R_{15}} \cdot \frac{R_{15}}{R_{14}+R_{15}} \cdot \frac{R_{14}+R_{15}+R_{18}}{R_{15}+R_{18}} \cdot V_y =$$

$$V_1 + \frac{R_{15}}{R_{14}+R_{15}} \cdot \frac{R_{14}+R_{15}+R_{18}}{R_{15}+R_{18}} \cdot V_1$$

If $R_{14}=R_{15} \gg R_{18}$, the total voltage supplied to the capacitor 11 must remain below 2 $V_1$, so that a variation from $\epsilon_1$ to $\epsilon_2$ can be obtained. This is an improvement as compared with the variation from $\epsilon_0$ to $\epsilon_1$, which is the most that may be obtained if no bias voltage were used, but a still further improvement can be attained, if the bias voltage:

$$\frac{R_{14}}{R_{14}+R_{15}} \cdot V_y$$

is chosen to be equal to 2 $V_1$.

In this case, it is true, the initial value would have been $\epsilon_2$, but the desired capacity value can be adapted without difficulty to this initial value by changing the surface area or the relative separation of the capacitor plates. The total voltage supplied may in this case be approximately 4 $V_1$. The variation which may then occur is from $\epsilon_2$ to $\epsilon_3$, and this variation is materially greater than the variation from $\epsilon_0$ to $\epsilon_2$, which would be obtained without bias voltage but with the same value of $V_d'$. This variation from $\epsilon_2$ to $\epsilon_3$ is also considerably greater than the variation from $\epsilon_1$ to $\epsilon_2$, which is obtained with a bias voltage of $V_1$ volts, as described above.

The fact that:

$$\frac{R_{15}+R_{18}}{R_{14}+R_{15}+R_{18}} \cdot V_d' \leq \frac{R_{14}}{R_{14}+R_{15}} \cdot V_y$$

follows from the fact that, when a y-conductor is switched off by the switch S from the source 6, the diodes 16 associated with this y-conductor must remain blocked when voltages for the further y-conductors are fed to the same x-conductors.

In the switched-off state the voltage produced by the source 3' at the anode of the diode 16 is determined by:

$$V_b' = \frac{R_{15}+R_{18}}{R_{14}+R_{15}+R_{18}} \cdot V_d'$$

and this voltage must be lower than or at the most equal to the voltage at the junction of the elements 11 and 12, since otherwise the diode 16 would be released. Since the bias voltage is equal to:

$$\frac{R_{14}}{R_{14}+R_{15}} V_y \text{ volts}$$

the condition mentioned above follows therefrom.

However, the choice of the bias voltage $V_1$ also depends upon the nature of the source 13. Source 13 is preferably a source producing an alternating voltage of a maximum amplitude. The following should be observed in this case:

(1) The amplitude of this alternating voltage is to be such that not at any instant there is a risk of conduction of the diode 16, (2) The amplitude is to be such that the effective dielectric constant $\epsilon$ of the storage element 11 is determined mainly by the voltage $V_d'$. The choice of the amplitude in view of the conditions, mentioned under 1 and 2, also depends upon the instants, when the switch S connects, in order of succession, the y-conductors to the source 6. If this occurs at arbitrary instants, undesirable brightness variations are found to occur in the image to be reproduced. However, if it occurs at instants, which, as is described in copending U.S. patent application Serial No. 59,254, filed September 29, 1960, are correlated with the alternating voltage supplied by the source 13, this disadvantage is avoided.

In FIG. 1 the generator 13 is connected to the device 7 via the conductor 19. It is thus ensured that the frequency of the alternating voltage supplied by the source 13 is an integral multiple of the frequency of connection of the y-conductors to the source 6. It is assumed, for example, that there are 625 y-conductors and that 25 images per second are to be reproduced; the line frequency then amounts to 15,625 c./s., and each y-conductor is connected every $\frac{1}{25}$ of a second (i.e. with a frequency of 25 c./s.) for a single line period of 64 $\mu$sec., to the source 6 by means of the switch S. The frequency of the alternating voltage source 13 may be chosen to be equal to 15,625 c./s., which is an integral multiple of 25 c./s. Moreover, both the switch S and the source 13 are controlled from the device 7, so that the switching frequency of the switch is coupled in a phase-locked manner with the alternating voltage supplied by the source 13. The phase position of this alternating voltage will therefore always be the same at each closure and opening of a contact of the switch S. In the aforesaid patent application Serial No. 59,254, it is shown that the most favourable instants of the closure of the switch S lie at the moments when the phase position of a sinusoidal alternating voltage is equal to 270°. In this case the voltage across the capacitor 11 can never drop below the bias voltage $V_1$, even if $V_d'$ were zero volts. Thus blocking of the diode 16 by the alternating voltage is excluded. There is thus a free choice for the amplitude of the alternating voltage as far as the condition (1) is concerned, which is not the case, when the closure occurs at the phase position of 0°, 90° or 180° of the sinusoidal voltage.

The aforesaid condition of a non-conduction of the diode 16 is to be observed rigidly, in the first place to avoid the aforesaid crosstalk and secondly to ensure that the capacitor 11 can be discharged only via the resistor 17. The time constant of the network consisting of the capacitor 11 and the resistor 17 is chosen so that the additional voltage:

$$\frac{R_{15}}{R_{14}+R_{15}} V_d'$$

has disappeared when the diode 16 is conducted again due to a re-closure of the switch S. If the diode 16 is conducted earlier, the charge of the storage element 11 could also leak away through the diode 16, so that the memory action thereof would be reduced.

The condition of conducting of the diode 16 is materially eased by forming the adder element 14 not as a resistor but as a diode in the manner shown in FIG. 1, the anode of this diode being connected to the diode 16 and the cathode to the x-conductor concerned.

The y-conductors are connected to earth via the resistor 18 for the major part of the time. The two anodes are then at earth potential. The cathode of the diode 16 attains a positive voltage of $$\frac{R_{14}}{R_{14}+R_{15}} \cdot V_y \text{ volts}$$

and the diode 14 can become conductive only when the voltage across the x-conductor concerned approaches earth potential. The source $V_d$ with the device 4 supplies only a positive voltage, which however may approach zero value. In the latter case the diode 16, however, does not conduct, so that no information is transferred to the storage element. If it is to be avoided under any condition that the diode 14 should become conductive at undesirable instants, the ends of the resistors 18 remote from the y-conductors may be connected to the negative terminal of a voltage source.

When the y-conductor concerned is connected to the source 6, the anodes of diodes 14 and 16 attain a positive voltage. The voltage $V_d'$ can then be transferred via the two diodes to the element 11. Since a positive voltage $V_d'$ is supplied to the cathode of the diode 14, the anode thereof must at any rate be at a higher positive voltage than the maximum value of $V_d'$. It should be ensured in this case that the impedance of the diode 14 for the signal $V_d'$ is not too low, since otherwise the desired value of the bias voltage of the storage element, determined by $$\frac{R_{14}}{R_{14}+R_{15}} \cdot V_y$$

could no longer be adjusted.

The use of the diodes 14 has the additional advantage that an x-conductor is not simultaneously loaded by all adder elements 14 and 15 of the crossings associated with this conductor. Only the crossing of which the diode 14 is conducting obtains, via the x-conductor concerned, energy (i.e. a signal containing information) from the device 4. The adder element 14 may therefore be a resistance element or a diode, but the adder element 15 must always be a resistance element, since it must not only serve the function of an adder but also the function of transferring the direct voltage to the diode 16, when the switch S connects the y-conductors concerned to the source 6.

In the foregoing it is invariably assumed that the device 4 produces positive voltages. Of course, this device is also capable of supplying negative voltages. The diodes 14 and 16 must then be connected inversely, and the negative terminal of the source 6 must be connected to the common contact of the switch S.

The device 4 need not transfer the voltages simultaneously to the x-conductors. If the switch S is constructed so that a y-conductor remains connected to the source 6 for one line period, the video signals may be fed sequentially to the x-conductors concerned, from where they are transferred sequentially via the circuit elements described to the storage elements 11 concerned. In this case the device 4 may be formed by a single, tapped delay line, the x-conductors being connected to these tappings. To the input terminals of this delay line, which is terminated by its characteristic impedance, are fed the line synchronising pulses and the delay line is connected to earth via the video-information source 3.

In the image reproducing panel shown in FIG. 1 two diodes 14 and 16, two resistors 15 and 17 and three additional conductors a, b and c are required to ensure a satisfactory transfer of the information from the crossings to the storage elements.

The image reproducing panel may be considerably simplified, when in accordance with a further aspect of the invention a y-conductor is connected by the switch S to the positive terminal of the source 6 for the major part of the time and is connected to earth only for the time when the diode 16 is to conduct.

Figure 3:
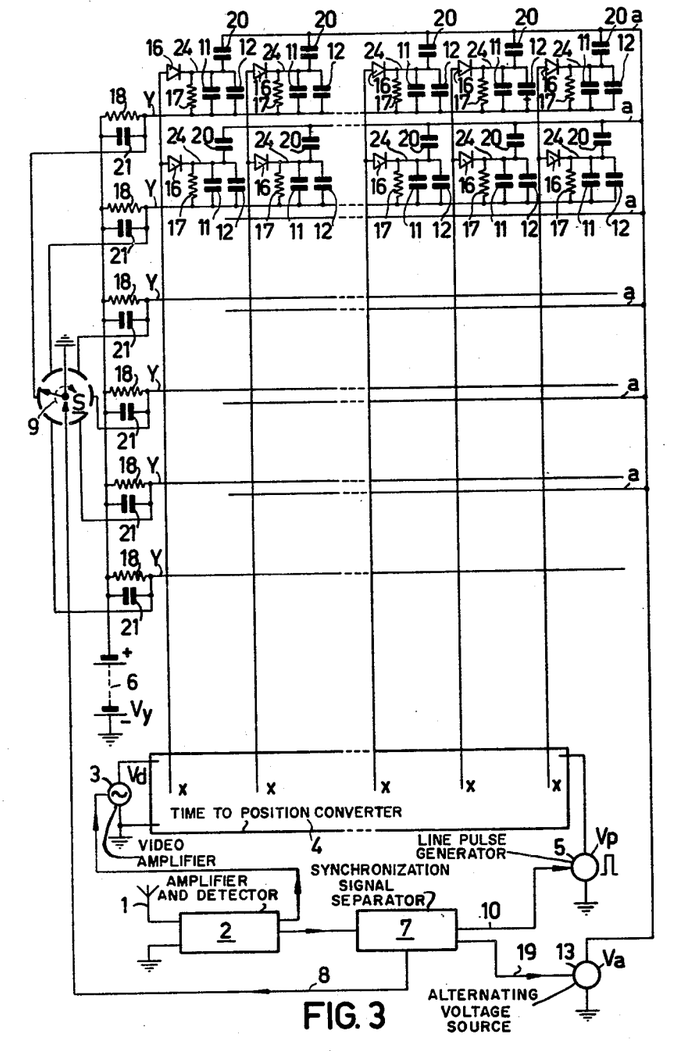
FIG. 3 illustrates a second, greatly simplified embodiment in which the reproducing part proper and the controlling cross-bar system are partly connected.

This is illustrated in FIG. 3, in which corresponding parts are designated by the same reference numerals. In this figure the elements 11, 12 and 17 are connected in parallel with each other, and the time constant of this parallel combination is such that the capacitors 11 and 12 are capable of discharging in $\frac{1}{25}$ sec., i.e. one image period. When the y-conductor concerned is connected to earth by the switch S for a short time, for instance 10 μsec., the capacitors 11 and 12 no longer exhibit a charge, so that the voltage prevailing at the crossing concerned can be fed via the then conducting diode 16 to the storage element 11. Series-connected capacitors 20 are added to convert the voltage-source control from the source 13, as shown in FIG. 1, into a current-source control. The value of each capacitor 20 is therefore chosen low with respect to the total capacitance of the parallel-connected capacitors 11 and 12. Moreover, the resistors 18 have large decoupling capacitors 21 connected in parallel with them, in order to complete the alternating current path via the source 13. The impedance of the source 6 is low for alternating currents.

Figure 4:
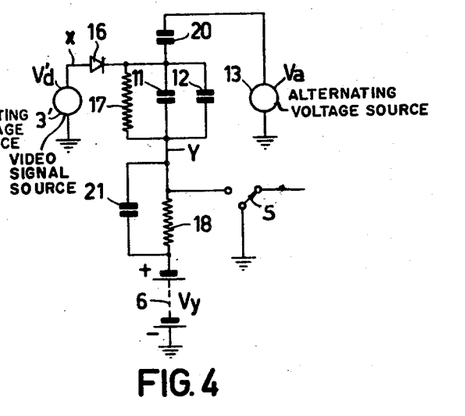
FIG. 4 shows an equivalent diagram of the device illustrated in FIG. 3 for writing and reading one storage element and one reproducing element.

The operation of the reproducing panel shown in FIG. 3 will now be explained with reference to FIG. 4, which shows an equivalent diagram of the circuit elements associated with one crossing. The voltage $V_d'$, supplied by the source 3' is again the positive direct voltage at the crossing concerned and only two contacts of the switch S are shown. If the y-conductor is not connected to earth, the voltage $V_y$ of the source 6 is distributed among the capacitors 21, 11, 12 and 20. It is assumed here that the source 13 is constructed so that substantially no direct voltage prevails at the terminals of this source. Since, moreover, the capacitance of the parallel-connected capacitors 11 and 12 is high with respect to that of the capacitor 20, but low with respect to that of capacitor 21, after the y-conductor has been disconnected from earth, the voltage $V_y$ will be instantaneously distributed among the capacitors 11, 12 and 20. It is assumed, for example, that the capacitors 11, 12 and 20 have capacity values of $C_{11}$, $C_{12}$ and $C_{20}$ farads respectively, $C_{11}+C_{12}=10C_{20}$ and $V_y=600$ v. In this case, shortly after the disconnection the voltage across $C_{11}+C_{12}$ is equal to about 54 v. and that across the capacitor 20 equal to 546 v. The diode 16 will thus be blocked. The polarity of the voltage is such that the junction of the elements 11, 12 and 17 with the diode 16 is negative relative to the y-conductor, so that a negative voltage appears across the parallel-combination. This occurs, however, only if no additional energy is fed from the source 3' to the parallel-combination of 11, 12 and 17. The positive voltage supplied by the source 3' may then be chosen to be equal to for example 54 v., which corresponds to a black signal. It should be remarked here that with current control the minimum value of $V_d'$ corresponds to black level and maximum value to white level. Since the time constant of the elements 11, 12 and 17 is chosen so that after $\frac{1}{25}$ sec. the capacitors 11 and 12 have discharged, the voltage across the capacitor 20 will be substantially equal to $V_y$ volts, shortly before the y-conductor is reconnected to earth. At the instant when the y-conductor is connected to earth, the charge of the capacitor 20 is distributed between this capacitor and the capacitors 11 and 12, so that across these capacitors again a voltage equal to $$\frac{C_{20}}{C_{20}+C_{11}+C_{12}} \cdot V_y = V_1 \text{ volt}$$

is produced, but as compared with the case in which the y-conductor is disconnected from earth, this voltage has opposite polarity. In the embodiment shown this voltage is equal to 54 v. and this bias voltage may again serve to adjust the value of ε so that after the addition of the voltage from the source 3' the total voltage at the cathode of the diode 16 is operative in the steep part of the characteristic shown in FIG. 6. It follows therefrom that the source 3' must always have a value of $V_1$ volt, on which the voltage for the image information is superimposed. By means of the device 4 this may be realised in a simple manner.

When the image information for a given crossing corresponds to $V_2$ volts, $V_d'$ is equal to $V_1+V_2$ and this total voltage is fed, in the manner described above, to the elements 11 and 12. It is assumed that the value of the capacitor 11 decreases to a capacitance value: $C_{11}/\alpha$ wherein $C_{11}$ designates the initial value of this capacitor and $1/\alpha$ is the amount by which this initial value has decreased.

After the disconnection of the $y$-conductor from ground the new voltage across the capacitors 11 and 12 becomes equal to $$V_{C_{11}}' = \frac{C_{20}}{\frac{1}{\alpha}C_{11}+C_{12}+C_{20}} \cdot V_y$$

provided the voltage across the parallel combination of 11 and 12 has remained the same in absolute value, since the curve indicating the value of $\epsilon_4$ as a function of the applied voltage has a symmetrical variation relative to the zero axis. This is evident from FIG. 6, in which the values of $\epsilon_4$ are indicated for the positive voltage of $(V_1+V_2)$ and for a negative voltage of this value. Since $\epsilon_4$ remains the same, the capacity value of $$\frac{1}{\alpha} \cdot C_{11}$$

will not vary.

From the foregoing it follows that the positive voltage $V_1+V_2$ must be equal to the absolute value of the voltage $V_{C_{11}}'$, which has a polarity opposite that of the voltage $V_1+V_2$.

In the same manner it can be proved that with a different value of $V_d'$, for example $V_d'=V_1+V_3$, the capacity value of the capacitor 11 becomes equal to $$\frac{1}{\beta} \cdot C_{11}$$

and that it must be true that:

$$|V_{C_{11}}''| = \left|\frac{C_{20}}{\frac{1}{\beta}C_{11}+C_{12}+C_{20}} \cdot V_y\right| = |V_1+V_3|$$

Also for other values of $V_d'$ it is to be ensured that the condition of the absolute equality of the voltage across the parallel-combination before and after the disconnection of the $y$-conductor from earth is fulfilled. This may be obtained by a suitable choice of the magnitudes $C_{11}$, $C_{12}$, $C_{20}$ and $V_y$. With this choice the requirement should, however, be taken into account that for each capacity value of the capacitor 11 the diode 16 should remain blocked as long as the $y$-conductor concerned is not connected to ground.

The maximum value of $V_d'$ must therefore remain lower than:

$$\frac{\frac{1}{\beta} \cdot C_{11}+C_{12}}{\frac{1}{\beta} \cdot C_{11}+C_{12}C_{20}} \cdot V_y$$

i.e. the voltage at the cathode of the diode 16 relative to earth directly after the associated $y$-conductor has been disconnected from ground, wherein $$\frac{1}{\beta} \cdot C_{11}$$

designates the minimum value of capacitor 11. The amplitude of the alternating voltage supplied by the source 13, the frequency and the phase thereof relative to the switching signal commutating the switch S are of the same importance as described with reference to the reproducing panel of FIG. 1. In this case the polarities of the voltages supplied by the various sources may be reversed in which event the diodes 16 are to be inverted.

It is furthermore important that the impedance of the source 13 should be substantially equal to zero for the switching frequency of 25 c./s. of the switch S, in order to avoid cross-talk of the information intended for storage elements associated with an earth-connected $y$-conductor to storage elements associated with the non-earthed $y$-conductors. This may be done by shunting the source 13 with the aid of an inductor having an impedance is substantially equal to zero for 25 c./s. but high for the frequency of the alternating voltage of the source 13, which may be, for example, 15,625 c./s.

It should be noted that the aforesaid condition of the absolute equality of the voltages is not strictly necessary. If this condition is not met, the voltages across the parallel-combinations of the elements 11, 12 and 17 will not only reverse their polarities but also their values, after the $y$-conductor concerned has been disconnected from ground, so that the capacitance of the capacitor 11 will be varied. However, there remains a certain relationship to the supplied voltage $V_d'$, but which relationship is not linear owing to the non-linearity of the curve of FIG. 6. If the supplied signal $V_d'$ is adapted to the said modification, i.e. if a gamma correction associated with this curve is introduced, the undesired contrast compression or expansion owing to commutation can be avoided. Since at any rate a certain degree of gamma correction is required with a view to the fact that the variation of $\epsilon$ as a function of the applied voltage has a non-linear course, this change-over involves a great gamma correction. By fulfilling the condition of the absolute equality of the voltage this additional gamma correction is avoided, which is an advantage in view of the complicated structure of such gamma correction circuits.

Figure 5:
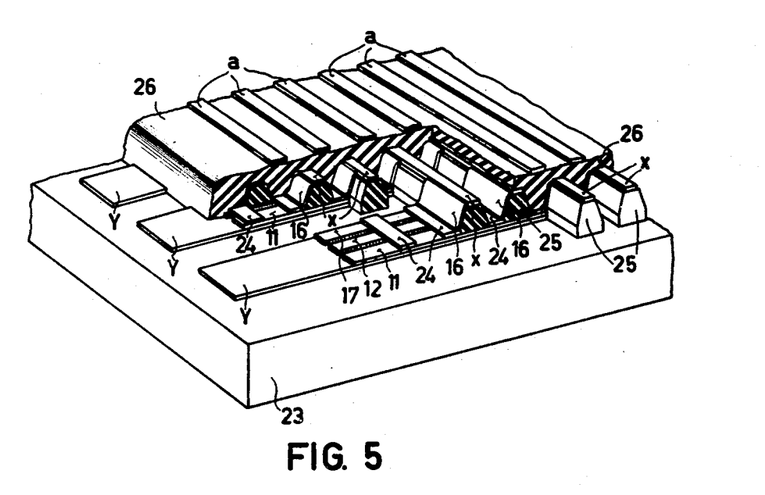
FIG. 5 shows a possible structure of a display panel as illustrated in FIG. 4.

The structure of a reproducing panel of the circuit of FIG. 3, may be as shown in FIG. 5.

On a transparent layer 23, for example, of glass, operating as a support, are provided transparent conductors $y$. These $y$-conductors may be applied by painting first an $Al_2O_3$ mass, operating as a binder, in a strip-shaped pattern on the glass plate. Then the conductor material for example tin oxide ($SnO_2$) is applied by spraying to the $Al_2O_3$ binder, after which the assembly is heated to a temperature of 550° C. Owing to this high temperature the binder burns away, which subsequent to heating may be dispensed with and can be wiped off.

The storage elements 11, the reproducing elements 12 and the resistance elements 17, shown in FIG. 3 are then applied to the $y$-conductors in the form of strips 11, 12 and 17. The strips 11 may be applied by applying the mixture of barium titanate and strontium titanate $(BaTiO_3)_x$, $(SrTiO_3)_{1-x}$ in the form of a paste, after which it is hardened at a suitable temperature, the assembly being subsequently polished to flatness. The barium titanate is provided, on the side where it is in contact with the $y$-conductor, with a layer of carbon embedded in enamel, in order to establish, during the hardening process, a rigid connection between the barium titanate and the $y$-conductor. The nature of the electrical contact is determined by the volume percentage of carbon relative to the volume percentage of enamel and may be chosen at will.

The strips 12 consist of zinc sulphide (ZnS), activated with, for example, $10^{-3}$ copper (Cu) atoms and $9.10^{-4}$ aluminium (Al) atoms per molecule of zinc sulphide in order to obtain a satisfactory electro-luminescence. These strips are applied by printing on the $y$-conductors by a printing technique (silk screen printing) an assembly of 40% of zinc sulphide and 60% of enamel with an organic binder. Then the assembly is heated so that the organic binder is completely burnt.

The strips 17 consist of carbon which is printed onto the $y$-conductors by a printing technique similarly to the strips 12, after which they are heated. The percentage of volume of carbon relative to the percentage of volume of the enamel determines the electrical resistance of the strips 17; the more carbon, the lower this resistance. The correct time constant of the parallel-combinations of the elements 11, 12 and 17 may thus be obtained.

Then electrodes 24 are provided, each establishing the connection of the said parallel-combination to a diode 16 and constituting one electrode of a capacity 20, of which the counter-electrode is formed by part of the conductor $a$. In order to obtain the required rigidity in the electrodes 24, they are made from the same material as the strips 17; they may be applied in the same manner, but the volume percentages of carbon are considerably higher in order to minimize the electrical resistance of the electrodes 24. As an alternative, the electrodes 24 may be made by applying aluminium (Al) by vaporisation or a silver paste (Ag) by a printing technique (silk screening). In this case, however, provisions should be made to prevent a short-circuit with the y-conductors. If necessary, this may be avoided by filling out the slits between the strips 11, 12 and 17 with insulating material.

Between the electrodes 24 are then arranged ribs 25 of insulating material. These ribs 25 are at right angles to the y-conductors and extend throughout the screen surface. They may be made from enamel with a filler added thereto, for example, quartz powder, in order to minimize the dielectric constant of the material and to enhance resistance against flowing during the time they are fixed on the panel and not yet hardened. On top of these ribs are to be arranged the x-conductors, whilst the diodes 16 are applied to their sides by spraying. The dielectric constant of the material of the ribs 25 and of the diodes 16 should be at a minimum, since the stray capacities from the parallel-combinations to the x-conductors should be low. They are to be negligible with respect to the total capacity value of the formed capacitors 11 and 12 in order to ensure a satisfactory blocking with the aid of the diodes 16.

The enamel with the filler is applied again in the form of a paste and then heated, after which the diodes 16 are applied by spraying to one of the sides of the ribs. This assembly is provided above each electrode 24, so that, as is shown in FIG. 5 a diode layer 16 is sandwiched between each electrode 24 and the associated x-conductor. The material of these diode layers consists of cadmium sulphide (CdS) with an electret. The CdS powder obtains photo-conductive properties by activating it with $2.10^{-4}$ copper (Cu) and $2.10^{-4}$ gallium (Ga) atoms per molecule CdS. The rectifying properties are obtained by providing the electrets in the material and a satisfactory operation of the diodes thus obtained requires that they should be continuously exposed in order to render them satisfactorily conductive in the desired current direction. Prior to use they are to be formed by means of a high D.C. voltage. After the complete structure of the reproducing panel has been described, it will be set out how the foregoing may be realized. The x-conductors referred to above may be made from aluminium (Al) and are applied by vaporisation to the peaks of the ribs 25.

Then the assembly is filled out by applying by spraying a filler 26, for example, polystyrene. Thus the whole structure obtains the required rigidity and, moreover, the a-conductors may be applied to this filler by vaporisation. These conductors may be made of aluminium (Al) and be applied just above the electrodes 24 to form, together with these electrodes the capacities 20. By a suitable choice of the dielectric constant $\epsilon$ of the material of the filler 26 and of the thickness thereof the desired value of the capacitor 20 can be obtained. Moreover, a suitable shape of the a-conductors is required to maximize the field intensity produced by the applied voltage between these conductors and the electrodes 24 and to minimize the same between the a- and the x-conductors. Thus the desired capacitive effect between the a-conductors and the electrodes 24 is raised to a maximum value and that between the a- and the x-conductors is minimized. If necessary, the shape of the x-conductors may be adapted thereto. The application by vaporisation of the aluminium x- and a-conductors may be replaced by a printing technique, if these conductors are made from silver.

The filler 26 should be transparent in order to expose the diodes 16 across it. The exposure may be obtained by arranging above the whole reproducing panel, a large plate to which a voltage is continuously supplied. This plate may be made from zinc selenide ZnSe, activated with $10^{-3}$ Cu-atoms and $10^{-3}$ Al-atoms per molecule of ZnSe, in order to adapt the spectrum of the radiation emanating from this plate to the spectrum to which the material of the diodes 16 is sensitive. The spectrum of the radiation produced by the strips 12 must be visible to the human eye and by choosing a different spectrum for the radiation emitted by this separately arranged plate as compared with the spectrum of the strips 12, it may be ensured that this additional radiation is not visible to the viewer. If this is the case, the ribs 25 and the electrodes 24 should be made from opaque material, so that the radiation from the additional plate can strike the diodes 16 but not the viewer.

The strips 12 need not exhibit electro-luminescent properties; they may be made, as an alternative, from field-extinguishing materials. Such so-called photo luminescent materials are described in the article of G. Destriau and H. F. Irvey: Proc. I.R.E., 1955, pages 1911–1938, particularly Chapter III. The radiation from the separate plate with the deviating radiation spectrum irradiates, in this case, not only the diodes 16 but also the strips 12, which luminesce without or with a low voltage being applied thereto. As soon as the applied voltage increases, this radiation extinguishes to a greater or smaller extent. By a suitable choice of the voltage $Vd'$ and of the activating voltage supplied by the source 13, such field-extinguishing strips 12 may be also be used.

The formation of the diodes 16 is carried out by applying, for some time, a high direct voltage between the x- and y-conductors. This D.C. voltage occurs via the resistors 17 across the diodes 16. This D.C. formation voltage must be materially higher than the maximum voltage occurring during operation and the polarity is such that the y-conductor is positive relative to the x-conductor.

It will be obvious that the various distances between the strips, conductors and layers are indicated only approximately in order to show clearly the whole structure of the reproducing panel. The relative distances between the y-conductors and between the x-conductors will be as small as possible, while the strips 12 will be as broad as possible in order to obtain the sharpest possible definition of the image to be reproduced. If desired, the plate 23 may have a diverging effect, so that the line structure of the strips 12 is obviated, as far as the radiation observed by the viewer is concerned.

FIG. 5 does not show the resistors 18 and the capacitors 21. These resistors and capacitors may, if desired, be applied in the form of strips transversely above the y-conductors. The resistors 18 can be applied in the same manner as the resistors 17 and the capacitors 21 in the same manner as the capacitors 11 or 12. However, the capacitors 21 will use as a dielectric the material of the layer 26. As an alternative, the elements 18 and 21 may be provided on a separate strip, and establish the various contacts with the y-conductors and with the switch S.

It will also be evident that the structure of a reproducing panel of which the circuit diagram is shown in FIG. 1 may be obtained in a manner similar to that described with reference to FIG. 5.

The reproducing panel proper consisting of the elements 11, 12 and 17 and the associated conductors $a$, $b$ and $c$ is built up separately from that of the controlling cross-bar system comprising the adder elements 14 and 15 and the x- and y-conductors. To the reproducing panel proper is applied the diode layer 16 and onto the latter the said cross-bar system. The diodes 16 and the diodes 14, if any, may again be exposed to radiation from above. The diodes 16 may be formed by applying a high D.C. voltage between the y- and c-conductors, the c-conductors being positive relative to the y-conductors. The diodes 14, if any, may be formed by applying a D.-C. voltage between the x- and the y-conductors, the x-conductors being positive relative to the y-conductors.

It should be noted that the storage elements 11 need not always be barium titanate cells. Instead thereof so-called varicaps may be employed. These are unilaterally conductive elements, which are driven, in the blocked state, while their capacitance value varies in inverse proportion to the root of the applied voltage. The basic material of these varicaps may be germanium or silicon, from which the known junction diodes are made.

The reproducing panels need not tbe exclusively employed for television purposes. Thanks to the memory effect of the elements 11, which may be improved by increasing the resistance value of the resistors 17, such panels are particularly suitable, for example, for telephone vision, in which an image of one telephone subscriber is to be rendered visible to the other subscriber. Owing to the more or less static nature of such images a slow scanning is permitted, which, however, involves the requirement of a satisfactory memory effect.

These panels may furthermore be used for computers. The elements 12 may each luminesce for a different digit. If, for example, the last x-conductor receives information about the units (i.e. the extreme right-hand x-conductor in FIGS. 1 and 3), the x-conductor preceding the former receives information about the decades and the x-conductor preceding the latter receives information about hundreds, and so on, a short-time connection of an y-conductor will be capable of visualizing a given digit, which remains visible as long as the elements 11 allow. Then, in order of succession, other digits may be visualized by connecting, for a short instant, further y-conductors, after each time the associated information has been supplied to the x-conductors from the computer proper.

A further possible use is found in the domain of radar technique. The panel for the reproduction of the radar image consists in this case of circular, concentric conductors, which replace the x-conductors, and of straight conductors arranged radially below or above the circular conductors, replacing the y-conductors of FIGS. 1 and 3. On the crossings of concentric conductors and radial conductors are again arranged the elements 14, 15 and 16, whilst the method of switching as shown in FIG. 1 is used, or the elements 11, 12, 16 and 17, while the method shown in FIG. 3 is employed. The structure of the further elements is adapted, as a matter of course, to the circular shape determined by the circular conductors. Also in the latter case control is carried out by means of a cross-bar system.

Other configurations of such a cross-bar system are also possible, for example, a system in which the conductors open out all on one side of the panel and are interwoven in the panel, whilst they do not establish, however, an electric contact with each other. On each crossing of one of the conductors with a further conductor may again be arranged the circuit elements shown in FIGS. 1 and 3.

It is furthermore possible to control a plurality of cross-bar systems. For example, with colour television, in which, for example, to each y-conductor three x-conductors with the associated circuit elements are added. In this case there are strips 12, which can luminesce in red, strips 12' luminescing in blue and strips 12'' luminescing in green, whilst the information is fed to them via the three separate x-conductors.

It should finally be noted that the switch S is indicated only by way of example. It is only essential that the y-conductors should be connected for a short time alternately either to the voltage source 6 (FIG. 1) or to earth (FIG. 3), and the switch S may thus be any device that serves this purpose.

What is claimed is:

1. A cross-bar system comprising first and second groups of parallel conductors arranged with the conductors of said first group crossing the conductors of said second group to define a plurality of conductor crossings, a variable impedance storage element and a reproducing element for each of said crossings, a source of electric signals, means for applying said electric signals to the conductors of said first group, separate unilateral conducting means for each said crossing for applying the electric signals on said first conductors to the storage elements of the respective conductor crossings whereby the impedances of said storage elements are varied in response to said electric signals, a common source of activation potential, means connecting each reproducing element to the respective storage element and to said common source for substantially continuous activation, a source of blocking potential, separate resistor means for connecting said source of blocking potential to each of said unilateral conducting means to prevent conduction therethrough, and means sequentially connected to said second conductors for removing the blocking potentials on the unilateral conducting means of the respective crossings.

2. A cross-bar system comprising first and second groups of parallel conductors, the conductors of said first group being arranged transversely of the conductors of said second group to define a plurality of conductor crossings, a variable impedance storage element and a reproducing element for each of said crossings, a common source of activation potential, means connecting each reproducing element to the respective storage element and to said common source whereby said reproducing elements are substantially continuously activated to an extent dependent upon the impedance of the respective storage element, a source of electric signals, means connecting said source of electric signals to said first conductors, separate unilateral conducting means for connecting each storage element to the respective first conductor whereby the impedances of said storage elements are varied in response to the electric signal on the respective first conductors, a source of blocking potential, a plurality of resistors for separately connecting said source of blocking potential to said unilateral conducting means for preventing conduction thereof, a point of constant potential with respect to said source of blocking potential, means sequentially connecting said second conductors to said point, and means connecting said second conductors to the unilateral conducting means of the respective crossings, whereby blocking potential is removed from the unilateral conducting means of the crossings of the second conductor connected to said point to permit the respective storage elements to assume impedances corresponding to the electric signal on the respective first conductor.

3. The system of claim 2, in which said reproducing element and storage element are capacitive elements.

4. The system of claim 3, in which the capacitive element comprising said storage element has a dielectric made from a ferro-electric material.

5. A cross-bar system comprising first and second groups of parallel conductors, the conductors of said first group being arranged transversely of the conductors of said second group to define a plurality of conductor crossings, a variable impedance storage element and a reproducing element for each of said crossings, a source of electric signals having first and second terminals, means connecting said first terminal to said first conductors, adder element means and first resistor means for each crossing serially connected in that order between the respective first conductor and the respective second conductor, a common source of activation potential, means connecting each reproducing element to the respective storage element and to said common source whereby said reproducing elements are substantially continuously activated to an extent dependent upon the impedance of the respective storage element, diode means for each crossing having one electrode connected to the junction of said adder means and said first resistor means, a source of D.C. voltage, means sequentially connecting said source of D.C. voltage between said second conductors and said second terminal, a tap on said source of D.C. voltage, separate second resistor means connecting said tap to the other electrode of each of said diode means, means connecting said storage elements between said second terminal and the other electrode of the diode means of the respective crossing, the voltage at said tap providing a blocking voltage for said diode means that is overcome when the respective second conductor is connected to said source of D.C. voltage.

6. The system of claim 5, in which said adder means is a second diode means wherein said one electrode of the first-mentioned diode means is the same type as the electrode of said second diode means connected to said junction.

7. The system of claim 5, wherein the voltage between said tap and said second terminal is equal to $$\frac{R_A}{R_A+R_1}V_y$$

where $R_A$ is the resistance of said adder means, $R_1$ is the resistance of said first resistor means, and $V_y$ is the voltage of said source of D.C. voltage.

8. The system of claim 5, wherein said reproducing element and storage element are capacitive elements serially connected to said common source, and said other electrode is connected to the junction of said storage and reproducing elements.

9. A cross-bar system comprising first and second groups of parallel conductors, the conductors of said first group being arranged transversely of the conductors of said second group to define a plurality of conductor crossings, a variable impedance storage element and a reproducing element for each of said crossings, a source of electric signals having first and second terminals, means connecting said first terminal to said first conductor, a first parallel circuit of said reproducing element, said storage element, and a first resistor at each crossing, a separate diode means for each crossing, a second parallel circuit of capacitor means and a second resistor for each crossing, means serially connecting said diode and first parallel circuit for each crossing in that order between the respective first and second conductors, means sequentially connecting said second conductors to said second terminal, a source of blocking potential having one end connected to said second terminal and the other end connected by way of said second parallel circuits to the respective second conductors, a common source of activation potential, and means connecting said common source to said reproducing elements for substantially continuous activation, said blocking potential blocking said diode means except when the respective second conductor is connected to said second terminal.

10. The system of claim 9, comprising a capacitor for each crossing wherein said capacitors have one electrode connected to the junction of said diode means and first parallel circuit and the other electrode connected to one end of said common source, the other end of said common source being connected to said second terminal.

11. The system of claim 9, in which said storage and reproducing elements are capacitive elements.

References Cited in the file of this patent
UNITED STATES PATENTS

| | | |
|---|---|---|
| 2,900,622 | Rajchman et al. | Aug. 18, 1959 |
| 2,904,626 | Rajchman et al. | Sept. 15, 1959 |
| 2,938,194 | Anderson | May 24, 1960 |